RESISTOR BIAS RING TRANSFER CIRCUIT

Filed May 17, 1954

INVENTOR.
MUNRO K. HAYNES
BY
William V. Schelberg
AGENT

United States Patent Office 2,881,413

Patented Apr. 7, 1959

2,881,413

RESISTOR BIAS RING TRANSFER CIRCUIT

Munro K. Haynes, Poughkeepsie, N.Y., assignor to International Business Machines Corporation, New York, N.Y., a corporation of New York Application May 17, 1954, Serial No. 430,059

5 Claims. (Cl. 340—174)

This invention is directed to a system employing magnetic memory devices for the storage and transfer of binary information and relates particularly to an arrangement having a plurality of consecutive stages with circuit means for controlling the transfer of pulses between adjacent stages.

The storage of binary information through establishing representative states of magnetization in bistable magnetic devices is well known. In such systems magnetic cores having a somewhat rectangular hysteresis characteristic are employed and are driven to one or another of their stable residual states by energizing windings which embrace the cores and apply a magnetomotive force of desired direction and magnitude.

One of the stable remanence states is arbitrarily chosen to represent a binary zero and the other remanence state then represents a binary one. When a change from one residual state to the other takes place an output voltage is induced in the windings linking the core and this induced voltage is employed for driving a succeeding core to a changed remanence state. With a plurality of similar cores coupled in cascade, a pulse produced in the output windings advances the information representing state from one stage to another, however, the input windings also experience an induced voltage which tends to transfer the information in a reverse direction.

Accordingly, one object of the present invention is to provide means for preventing a reverse transfer of information in a cascaded series of magnetic devices.

In accordance with the invention, a common resistor is provided in series with each of the output windings and a voltage is developed thereacross which effectively blocks the voltage induced in the write winding of preceding cores of a cascaded series.

Another feature of the invention resides in provision of a self-regulated blocking voltage for inhibiting an effective back transfer of pulses.

Still another object of the invention is to provide a magnetic core ring circuit wherein only a predetermined limited number of information representing magnetic states may be circulated.

Other objects of the invention will be pointed out in the following description and claims and illustrated in the accompanying drawings, which disclose, by way of example, the principle of the invention and the best mode, which has been contemplated, of applying that principle.

Figures 1, 2:
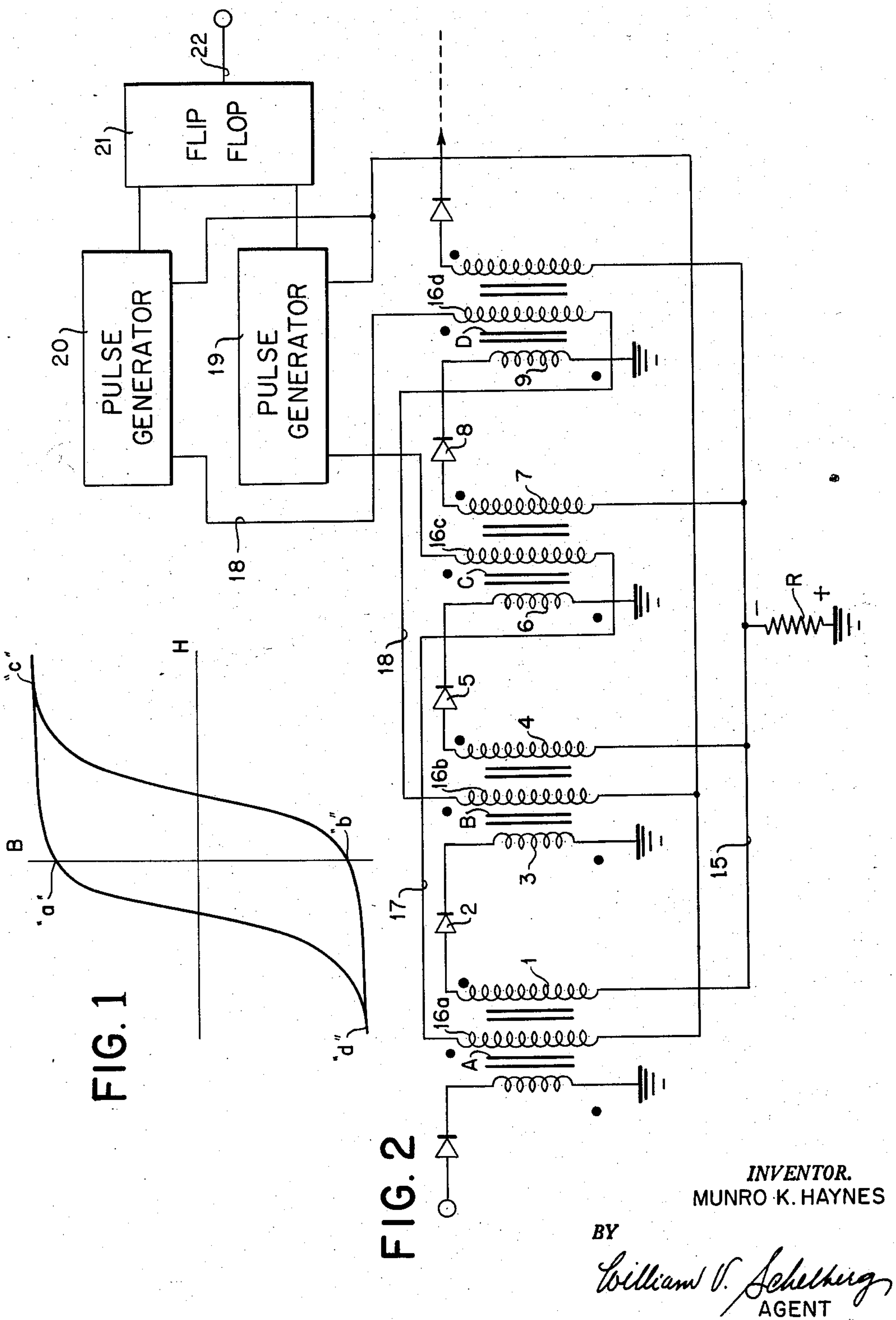
Figure 1 is an idealized hysteresis characteristic for the magnetic material used in the storage cores employed in the present invention.
Figure 2 is a schematic circuit diagram of a series of cascade coupled cores interconnected with the resistor bias pulse transfer circuit.

The bistable magnetic cores employed for the purposes of the present invention are interlinked with an input winding and a drive winding which, when selectively energized, cause the cores to be magnetized in one or the other remanence direction. An output winding positioned about each core develops an induced voltage as a result of the change of flux occasioned by shifting the magnetic state of the core. Figure 1 illustrates an idealized hysteresis loop for commercially obtainable magnetic material. If a core of such material is in the state of remanence indicated by point *a*, application of a positive magnetomotive force causes it to traverse its hysteresis curve to point *c* and, upon relaxation of this positive force, returns to point *a*. Application of a negative magnetomotive force, greater than the coercive force of the material, causes the curve to be traversed to point *d* and, when the force is terminated, goes to point *b*. Similarly, with the core standing at point *b*, application of a negative magnetomotive force causes the curve to be traversed to point *d* and return when the negative force is relaxed, while a positive force, greater than the coercive forces, causes a traversal of the curve from point *b* to point *c* and return to point *a* when the positive force is terminated.

Points *a* and *b* are stable remanence states readily adapted for representing binary information and the cores may be driven to one or the other of these two states by energizing the drive or input windings. A change in state is observed through the voltage pulse induced in the output winding as the magnetic field in one direction collapses and builds up in the other direction. With point *a* arbitrarily selected as representing a binary one state and point *b* a binary zero state, application of a negative force by pulsing the drive winding causes a voltage to be induced in the output winding simultaneously if a "one" is stored, while a negligible voltage is induced in the output winding if a "zero" is stored.

It is common practice to arrange magnetic binary elements in consecutive stages, with each stage comprising a single element adapted to furnish a single output. Each pair of adjoining stages is connected together by a transfer circuit whereby a change in the magnetic state of one stage may effect a change in the next stage. A simple example of this is an information delay line or shifting register comprising a series of stages in which each stage contains a single magnetic element normally in its binary "zero" condition. To enter a binary "one" in any stage, a write pulse is applied to a primary winding of the core in that stage reversing the magnetic flux. To read the binary "one" stored in any stage, a drive or read pulse is applied to the drive winding for again reversing the magnetic flux in the core thereby restoring it to its initial "zero" state. The voltage pulse induced in the secondary or output winding when the core is restored from the "one" to the "zero" state is applied as a transfer pulse to the write winding in the next succeeding stage causing the latter core to change from a zero to a one state.

Figure 2 shows an arrangement of cascade coupled cores A, B, C, D—such as may be employed in a delay line, shifting register, counter ring or the like. Core A is provided with an output winding 1 and is connected through a diode 2 to an input winding 3 of the core B. Similarly an output winding 4 of core B is coupled through a diode 5 to an input winding 6 of the core C and an output winding 7 of this core is connected through a diode 8 to the input winding 9 of the core D, etc. The other terminal of each of the illustrated input windings 3, 6 and 9 is connected to ground and the remaining terminal of each of the output windings 1, 4 and 7 is connected to a bus 15 which is grounded through a resistor R. Each of the cores is provided with a drive winding 16 to which corresponding subscript labels are given. Windings **16*a* and 16*c* are connected to a first drive pulse line 17 while the windings 16*b* and 16*d* are connected to a drive line 18. The lines 17 and 18 are adapted to be alternately pulsed and are connected through pulse generators 19 and 20, respectively, of any well known type and which are operated by a conventional flip-flop unit 21 to which actuating pulses may be applied via lead 22**.

The drive lines 17 and 18 are alternately pulsed to advance a binary digit from one core to another in sequence, with the winding 16 of alternate cores simultaneously energized since read and write operations cannot be accomplished at the same time in a single core.

A dot is placed near one end of each of the windings in Figure 2 and indicates that the adjacent end of that winding has a negative polarity during writing a binary one and a positive polarity on reading a binary one stored in the associated core.

In accordance with the invention, the circuit described is adapted to pass a normal transfer pulse and to discriminate against all other pulses applied between stages. Considering the core A to be in a binary one representing state and each of the other cores B, C, D etc., to be in a zero remanence state, to advance the one representation in core A to core B, the drive line 17 is pulsed energizing the windings **16*a* and 16*c***. Core A changes remanence states from points *a* to *d* to *b* (Fig. 1), while core C changes from *b* to *d* and returns to *b*. As core A changes remanence states, a voltage is induced in winding 1 with polarity as indicated by the dot marking and in a proper direction to pass current through the diode 2 and winding 3 of core B. Core B now changes remanence states and the binary one representation in core A has been transferred to core B. To advance the representation further, the drive line 18 is pulsed and the windings **16*b* and 16*d* are energized with an output pulse induced in like manner in winding 4, poled to pass the diode 5 and energize the input winding 6 of core C. When the normal transfer pulse is produced in the ouput winding to advance the representative magnetic state to the next core, the input winding of the core being read experiences an induced voltage which tends to transfer the information in a reverse direction and the core being written into likewise experiences an induced voltage in its output winding. The series diodes 2, 5, 8 etc. are provided to prevent forward transfer beyond the next successive stage and their functioning can be considered in view of the polarity markings applied to the windings. For example, on receipt of a write pulse on winding 3 of core B, an output pulse is induced in winding 4 which would tend to flow through winding 6 of core C in a read direction. This direction of current flow, however, is blocked by the series diode 5** and this induced voltage is ineffective.

When core B is read as by pulsing the winding **16*b* from line 18, the polarity of the induced voltages are positive at the dot marked ends of the windings and a valid transfer pulse passes the series diode 5 substantially unimpeded as described. As the winding 16*b* is pulsed, a back transfer voltage is also induced in the input winding 3 and is in such a direction as to pass the diode 2**.

To prevent this back transfer pulse from being effective, the resistor R is provided across which a voltage is developed that effectively blocks the voltage induced in the write winding. When winding **16*b* is pulsed to read core B, a valid forward transfer pulse is developed in winding 4 and passes diode 5, winding 6, to ground and thence through the resistor R back to the other terminal of winding 4 through the common bus 15. The drop in voltage developed across resistor R is of the polarity indicated. A voltage is also developed in winding 3 on receipt of the read drive pulse and the current tends to flow to ground and through the resistor R to winding 1, diode 2 and back to the negative terminal of winding 3. No current flows in this path, however, due to the voltage drop developed across resistor R by the valid transfer pulse, the sum of the voltages in the back transfer path being substantially zero with the input and output windings 4 and 3** having a two to one ratio of turns.

It can be observed from this description that the magnitude of the current flowing through the resistor R is due to a single forward transfer pulse, as when a binary one is circulated around a closed ring of coupled cores. The value of the resistance R may be adjusted so that only a single binary one may be propagated since the voltage drop thereacross would be greater with more than one forward transfer pulse flowing through it and the system would be unstable. Should a further transfer pulse develop a voltage drop equal to the voltage induced in the winding 4, for example, no current would flow through winding 6 in the B—C core transfer path.

In operating a closed ring of stages as in a frequency dividing or counting device, any number of stages N may be provided in accordance with the radix desired and an output pulse taken from the Nth core output winding or from separate output windings. Input pulses may then be applied to the lead 22 causing the flip-flop 21 to alternately pulse the two drive lines 17 and 18 through the pulse generators 19 and 20. Any number of further output windings may be provided on the cores of the several stages within their driving power, with each operating independent load devices in accordance with a predetermined sequence of input pulses applied to the lead 22, or load devices may be connected to the existing output windings illustrated.

The resistor bias transfer arrangement described has the advantage of providing a self-regulation of the back transfer blocking voltage, that is, with variation in the magnitude of the drive current pulse applied to the winding 16, the output or transfer current is proportionally varied so that the voltage drop across resistor R is similarly varied and the blocking voltage is always in correct proportion to that developed in the back transfer direction in the input winding. Further, since the recovery time of the series diodes is not critical in the circuit arrangement, junction rather than point contact type rectifiers may be used with consequent reduced circuit costs, and greater freedom of circuit design.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A circuit for transferring information by voltage pulses comprising a series of magnetic storage devices having alternate stable magnetic states, write means for individually causing said storage devices to assume one of said stable states, read means for individually resetting said storage devices to the other of said stable states, output means for said devices, said output means being energized when said storage devices are reset from said one stable state to the other of said stable states, a transfer circuit coupling said output means of each device to said write means of the next adjacent device, said transfer circuit including an individual unidirectional conductive element and a common passive impedance element to establish a blocking voltage for discriminating against back transfer voltage pulses.

2. A circuit for transferring information by voltage pulses comprising a series of magnetic storage devices each capable of assuming alternate stable residual states representative of binary information, write means for each of said devices, said write means being adapted to cause said devices to assume one of said stable states when energized, read means for each of said devices, said read means being adapted to cause said devices to assume the other of said stable states when energized, output means for each of said devices, said output means developing a voltage pulse when said storage devices are reset from one to the other of said stable states, a transfer circuit coupling said output means of one device to said input means of an adjacent device and including a unidirectional conductive element, and a single passive resistor element in series with and common to each of said transfer circuits for establishing a discriminating blocking voltage preventing back transfer of pulses.

3. A circuit for transferring information by voltage pulses comprising a series of magnetic cores each capable of assuming alternate stable remanence states representative of binary information; write, drive and output windings embracing each said core; means for pulsing the drive windings of alternate ones of said cores; a transfer circuit coupling the output winding of each core with the write winding of the succeeding core; said transfer circuit including a unidirectional current conducting device; and a single passive impedance element in series with and common to each said transfer circuit.

4. A circuit for transferring information by voltage pulses comprising a series of magnetic cores each capable of assuming alternate stable states of magnetization representative of binary information; input, drive and output windings for each said core; means for pulsing the drive windings of alternate ones of said cores; a transfer circuit coupling the output winding of each core with the input winding of the next succeeding core; said transfer circuit including a diode poled to conduct current only in one direction and a single passive resistor element in series with said transfer circuit and common to each said transfer circuit.

5. Apparatus for transferring information by voltage pulses comprising a series of magnetic storage elements, each including a core of magnetic material having two alternate states of magnetic stability respectively corresponding to alternate active and inactive conditions of the respective storage element, a write winding on each core adapted to be pulsed for causing the respective storage element to assume its active condition, a read winding on each core adapted to be pulsed for resetting the respective storage element to its inactive condition, an output winding on each core wherein voltage pulses are induced in response to changes in the magnetic state of the core, a transfer circuit coupling the output winding of a first storage element to the write winding of a second storage element for causing said second storage element to assume its active condition when said first storage element is reset from its active condition to its inactive condition, said transfer circuit including a unidirectional current conducting device which is responsive to the voltage developed in said first output winding when said first storage element is reset, means for pulsing the read windings of alternate ones of said cores and means for introducing an additional potential into said transfer circuit to control the response of said input windings when the associated core is reset, said means including a single passive resistor element connected in series in said transfer circuit.

References Cited in the file of this patent

UNITED STATES PATENTS

| | | |
|---|---|---|
| 2,708,722 | An Wang | May 17, 1955 |
| 2,768,312 | Goodale et al. | Oct. 23, 1956 |

OTHER REFERENCES

Publication: Paper #150 of IRE Meeting, Mar. 5, 1953, Fig. 7, page 6.

Publication: Journ. of App. Phy., January 1950, pp. 49–54.